United States Patent [19]

MacGee

[11] Patent Number: 4,712,370
[45] Date of Patent: Dec. 15, 1987

[54] SLIDING DUCT SEAL

[75] Inventor: Andrew MacGee, Cincinnati, Ohio

[73] Assignee: The United States of America as represented by the Secretary of the Air Force, Washington, D.C.

[21] Appl. No.: 855,243

[22] Filed: Apr. 24, 1986

[51] Int. Cl.⁴ .................... F02C 6/18; F02G 3/00
[52] U.S. Cl. .................... 60/39.07; 60/226.1; 277/206 R
[58] Field of Search .................... 60/39.07, 226.1, 262, 60/39.32; 277/27, 206 R, 200; 415/113

[56] References Cited

U.S. PATENT DOCUMENTS

| | | |
|---|---|---|
| 2,488,867 | 11/1949 | Judson . |
| 2,763,462 | 9/1956 | McDowall et al. . |
| 2,968,467 | 1/1961 | McGregor . |
| 3,169,749 | 2/1965 | Harris . |
| 3,363,910 | 1/1968 | Toronchuk ........................ 277/27 |
| 3,777,489 | 12/1973 | Johnson et al. .................. 60/39.07 |
| 4,013,297 | 3/1977 | Smith ................................ 277/27 |
| 4,055,041 | 10/1977 | Adamson et al. ............... 60/226.1 |
| 4,317,646 | 3/1982 | Steel et al. ........................ 415/116 |
| 4,375,891 | 3/1983 | Pask .................................. 277/27 |
| 4,611,758 | 9/1986 | Geberth, Jr. ..................... 277/27 |

FOREIGN PATENT DOCUMENTS

| | | | |
|---|---|---|---|
| 2397575 | 3/1979 | France ............................. 277/27 |
| 856977 | 12/1960 | United Kingdom ............. 277/27 |
| 1025884 | 4/1966 | United Kingdom ............. 277/27 |

Primary Examiner—Louis J. Casaregola
Assistant Examiner—Donald E. Stout
Attorney, Agent, or Firm—Jules J. Morris; Donald J. Singer

[57] ABSTRACT

A seal assembly 34 for forming an air seal around conduits or accessories 32 crossing aircraft engine bypass ducts 30. The seal assembly comprises a seal retainer plate 40, a seal plate 36 and a seal ring 44. The seal ring 44 has two opposingly sprung legs which seat and form air seals at the duct wall 30 and the seal plate 36.

3 Claims, 9 Drawing Figures

SLIDING DUCT SEAL

STATEMENT OF GOVERNMENT INTEREST

The invention described herein may be manufactured and used by or for the Government for governmental purposes without the payment of any royalty thereon.

BACKGROUND OF THE INVENTION

This invention is related to internal seals for air bypass ducts on turbofan aircraft engines.

Modern gas turbine aircraft engines are typically turbofan engines in which a first compressor stage(s) drives some of the intake air into the core of the engine as the remaining intake air bypasses the engine core and rejoins the engine air stream at the exhaust. The engine core generally comprises a high pressure compressor, a combustor and a high pressure turbine. A relatively high percentage of air bypasses the engine core in comxerical engines while in military engines a relatively small percentage of air bypasses the core.

All turbofan engines and particularly augmented turbofan engines require numerous pipes, tubes, shafts and other accessory conduits to pass through the bypass duct in order to connect the core engine with the engine case. There is a need to seal these accessory conduits to prevent air from leaking out of the bypass duct. Leakage of air from the duct causes a decrease in aircraft engine operating efficiency.

Since aircraft engines are exposed to thermal growth, vibration and other sources of relative motion, some kind of movable seal is required between the accessory conduits and the bypass duct. A conventional sliding seal assembly used to prevent air leakage from a bypass duct is shown in FIG. 1. FIG. 1 is labeled "prior art".

FIG. 1 shows a typical connection between a core engine combustion chamber and the outside of the engine case. An accessory 10 is sealed by a conventional seal 12 at the bypass duct wall 14. A sliding seal piece 16 fits tightly around the accessory 10. This seal piece is free to slide within its retaining plate 18 that is bolted to the duct wall 14 by bolts 20. These types of seals have been successfully used for many years.

New types of aircraft engines are being developed that achieve higher bypass air pressure and/or higher operating temperatures. These advanced technology engines require improved sealing means. When the conventional seal is used in an engine having a high bypass pressure, air flows between the duct wall lip 22 and the conduit 10 and presses upward on disk 16. This upward pressure causes the retaining plate 18 to lift or bow slightly away from the duct wall 14. This results in increased bypass air leakage from the engine and in a loss of engine efficiency.

Another type of conventional sealing arrangement utilizes a segmented metallic piston ring which is positioned to slide between two flanges on the accessory conduit. The piston ring seals against a cylindrical bore machined or assembled onto the bypass duct wall. Unfortunately, this type of seal arrangement can only be used for circular hole. It is not always practical to use circular holes in the bypass duct considering the variety of accessory conduits, and as a result piston rings cannot always be used. Piston rings also tend to be bulky, heavy and expensive to manufacture.

Improved seals are particularly necessitated by the development of aircraft engines which are designed to be efficient both at subsonic and supersonic aircraft speeds. These engines are capable of varying engine geometry to change their bypass pressure ratios in order to maximize engine efficiency throughout the flight envelope. This type of engine can develop very high bypass air pressures relative to ambient air pressure. This makes leakage from the engine bypass duct both more likely and more serious. In view of the above a new sealing means is required for limiting air leakage at accessory conduits which penetrate duct walls.

It is an object of the present invention therefore to provide a bypass duct sealing device which provides an improved air seal for accessory conduits and is particularly useful for aircraft engines having high bypass air pressures.

SUMMARY OF THE INVENTION

The invention comprises an air seal for aircraft engines which reduces leakage associated with accessory conduits penetrating air duct walls, particularly bypass ducts. The seal consists of a sliding seal plate which encircles the accessory conduit, a retaining plate for retaining the seal plate adjacent to the air duct wall and a sprung seal member interspaced between the air duct wall and the sliding seal plate.

The seal member comprises two opposingly sprung seal legs. One of the seal legs is adjacent to the sliding seal plate and the other is adjacent to the air duct wall. A small cavity is formed h=tween the seal legs, or forks, which fills with bypass air. As bypass air pressure increases the effective spring force on the sealing legs is increased by the increased air pressure in the cavity, this improves seal effectiveness. Retaining clips may be associated with the seal member in order to retain the member in its proper sealing position during engine assembly and disassembly.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
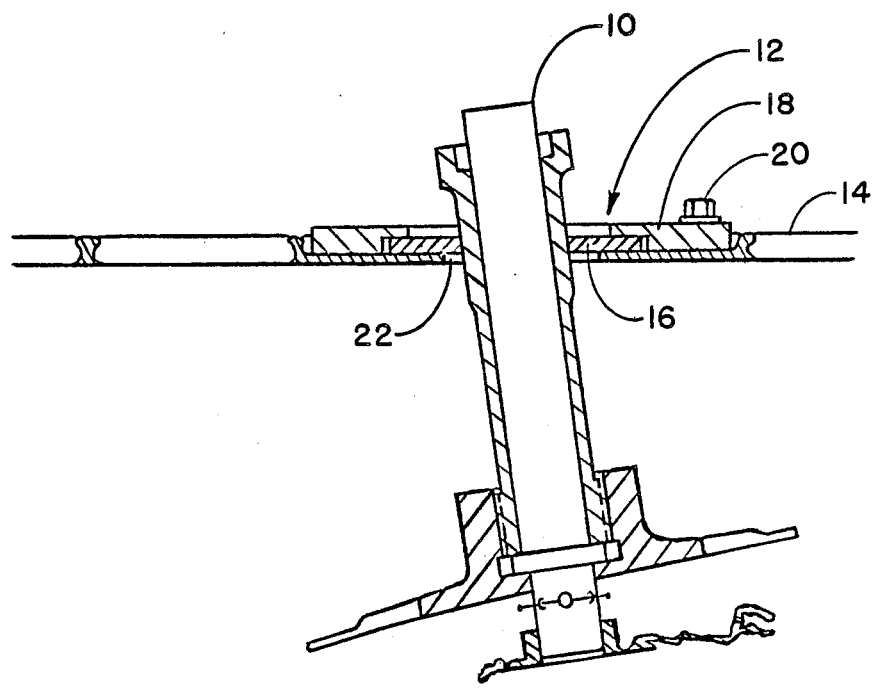
FIG. 1 is labelled "prior art" and is a partial cross section of an aircraft engine bypass duct having an accessory conduit passing therethrough and sealed at a bypass duct wall by a conventional sealing device.
Figure 2:
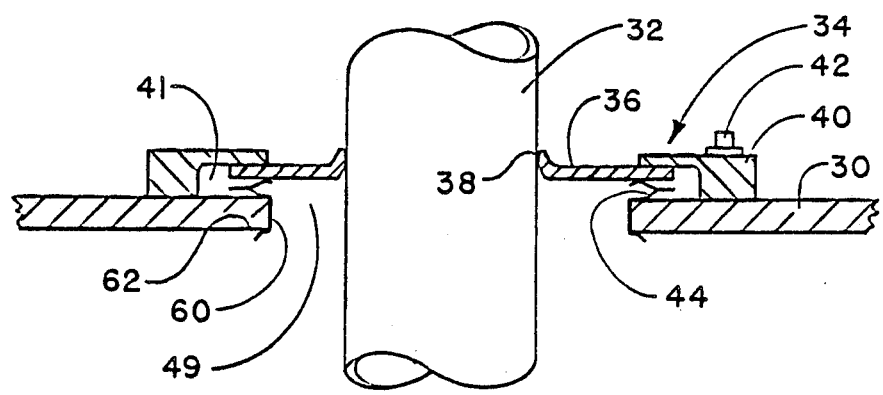
FIG. 2 is a fragmentary sectional view of a by pass duct wall and an accessory conduit including the sealing device of this invention.

FIG. 2 shows a portion of an aircraft engine bypass duct wall 30 through which passes an accessory conduit 32. The accessory conduit is cylindrical in the view of FIG. 2, however, this invention applies to conduits of a variety of shapes. It can be successfully used with substantially square and rectangular conduits passing through bypass duct walls.

An air seal 34 comprising the principles of this invention is used to seal between conduit 32 and bypass duct wall 30. The seal 34 comprises three main elements: a seal plate 36, a retainer plate 40 and a seal fork, or seal ring, 44.

The sliding seal plate 36 abuts the conduit 32 and has a sealing surface 38. The sealing surface, or flange 38 is very closely matched in size to the outer dimension of the conduit 32. This is to prevent the passage of air between the sealing flange 38 and the conduit. Some up and down movement of the conduit, parallel to the conduit axis may be allowed at sealing surface 38 to compensate for thermal expansion.

The sealing plate 36 is retained in position adjacent to the bypass duct wall 30 by a retainer plate 40. This retainer plate is bolted with several bolts 42 to the air duct 30. The retaining plate traps the seal plate 36 but allows sliding movement of the plate in a direction parallel to the engine axis (i.e., perpendicular to the conduit's long axis). This allowable movement eases assembly and helps the seal device compensate for thermal growth, vibration and other sources of relative motion between the conduit and the bypass duct.

Figure 3:
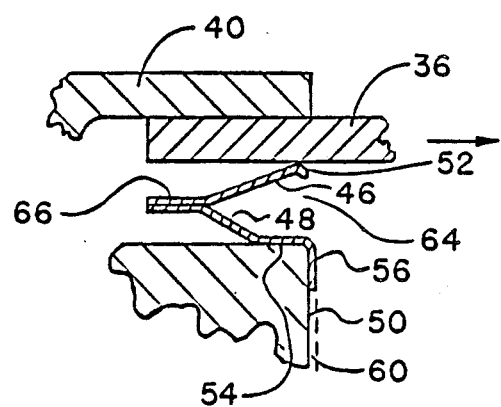
FIG. 3 is a magnified cross sectional close-up of a section of FIG. 2.

Sliding motion of the seal plate 36 is shown by the arrow of FIG. 3 and is limited by the seal retaining plate cavity 41 (FIG. 2) of the seal retainer plate 40. This sliding relative motion of seal plate 36 is unimpeded by the seal ring 44.

The air seal between the seal plate 36 and the air duct wall 30 is completed by means of the seal ring which is also called a seal fork 44. The seal ring encircles the conduit 32 and is located adjacent to the duct wall opening 49 through which the conduit passes. The seal fork 44 comprises a seal member having two seal legs 46, 48 (FIG. 3). The seal legs 46, 48 are opposingly sprung so tight air seals are formed at sliding seal surface 52 and duct surface 54. These two air seals, in conjunction with seal surface 38, complete the seal between the conduit 32 and the bypass duct wall 30.

Figure 4:
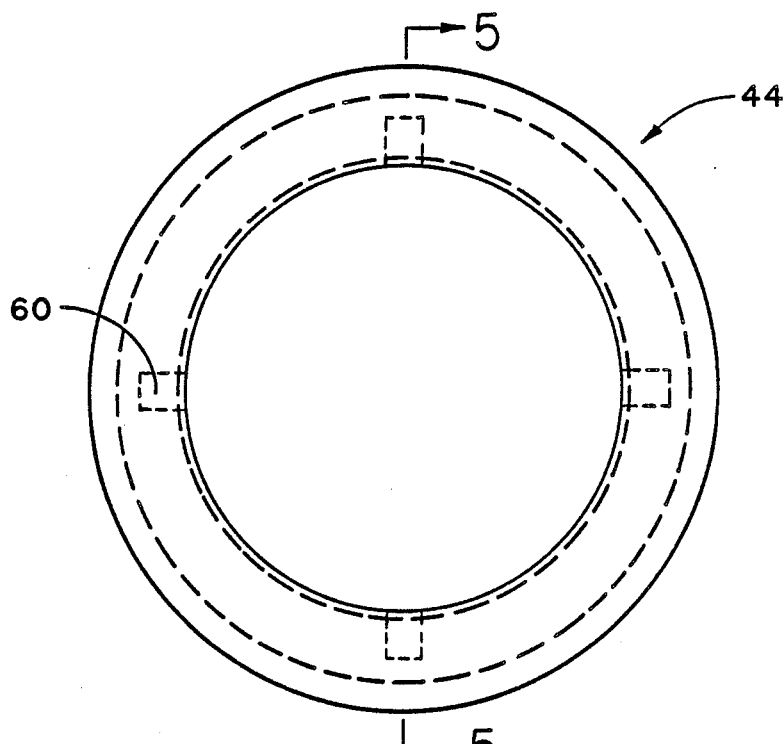
FIG. 4 is a top view of the seal ring of FIG. 2.
Figure 5:
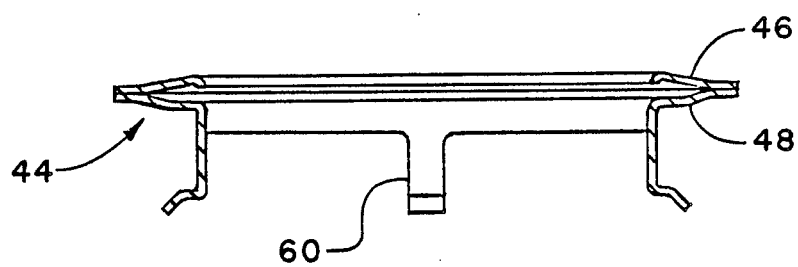
FIG. 5 is a cross-sectional view of the seal ring taken along lines 5—5 of FIG. 4.
Figure 6:
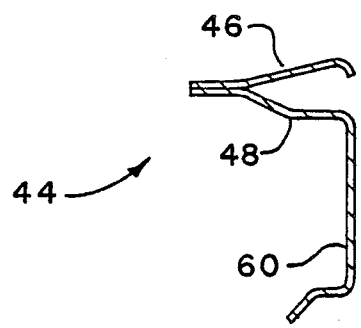
FIG. 6 is an enlarged cross-sectional view of the seal ring of FIG. 2.

Flange 56 at the end of sealing leg 48 helps to properly locate the sealing fork 44 at the edge of the duct wall opening 49. At four places the leg is extended to form retaining clips 60 (FIGS. 4, 5, 6) that maintain the seal fork in position during bypass duct assembly and disassembly. The retaining clips 60, (as shown in FIG. 2) wrap over the lower surface 62 of the duct wall. Two or three retaining clips would be suffficient to locate the seal fork 44.

One aspect of the operation of this seal fork that significantly adds to its sealing effectiveness is the advantageous use made of cavity 64 formed between seal legs 46 and 48. Cavity 64 is fluidly connected to the bypass air cavity through which the conduit 32 passes. Therefore, as bypass air pressure increases and the need for effective sealing increases, air pressure in cavity 64 increases. This increase in air pressure between legs 46 and 48 tends to add to the spring force pushing the two legs apart. The spring force effectively increases and produces a tighter seal at surfaces 54 and 52. This results in decreased air leakage and more effective sealing. The force on the legs decreases when relative air pressure decreases due to an engine pressure change. This allows easier sliding motion of the sliding seal 36 (if required) and easy seal disassembly at shutdown.

The seal fork is preferably manufactured from two leaves of springy metallic material; one leaf forms fork 46 and the other leaf forms fork 48. These two leaves of material, once properly formed in the shape shown in FIG. 3, are joined by welding or brazing at stem 66. When the leaves are brazed a smooth radiused fillet is formed at the point where the forks part. This increases seal ring strength at a point which could be subject to high stress. In order to supply a spring force when assembly, the natural separation (unbiased position) of the seal legs is slightly wider than the cavity between the seal plate and the duct wall.

Figure 8:
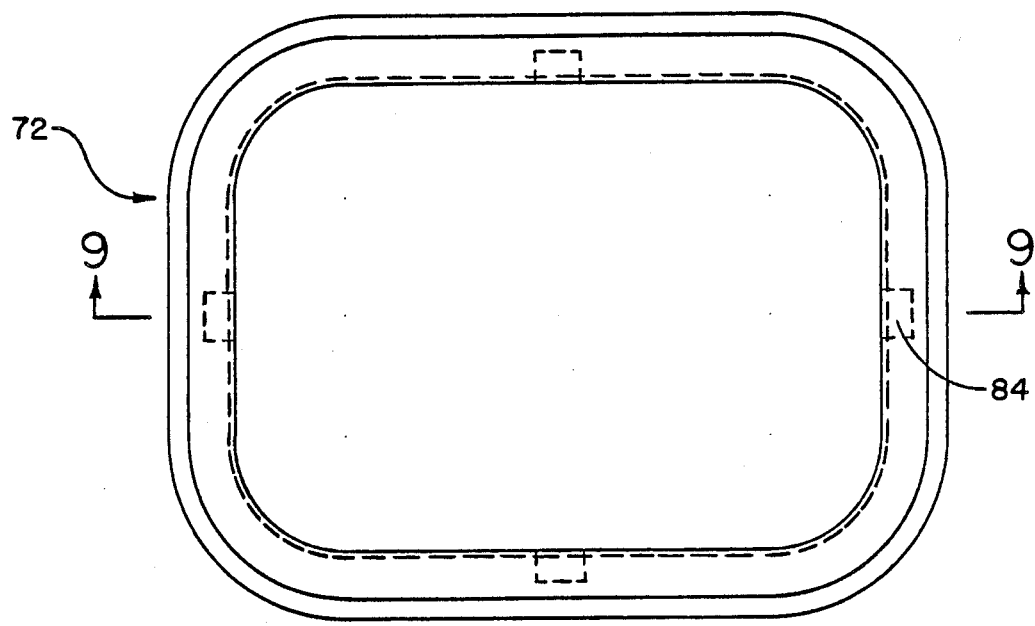
FIG. 8 is a top view of the seal ring of FIG. 7.
Figure 9:
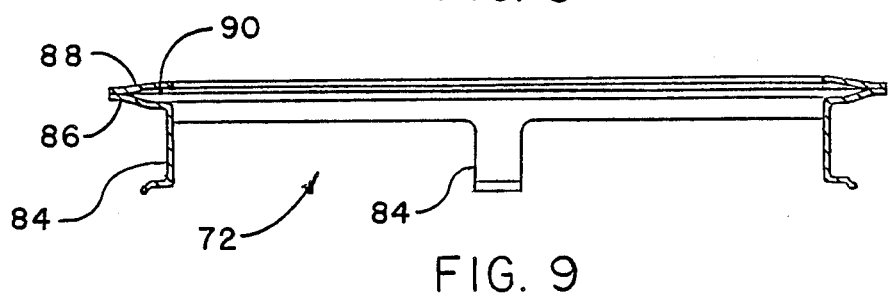
FIG. 9 is a cross-sectional view of the seal ring taken along line 9—9 of FIG. 8.

Since the seal rings are easy to manufacture they can be used with a large number of different conduit shapes, this includes square, circular, rectangular, many sided and elliptical shapes. A substantially rectangular sealing device is shown in FIGS. 7, 8 and 9.

Figure 7:
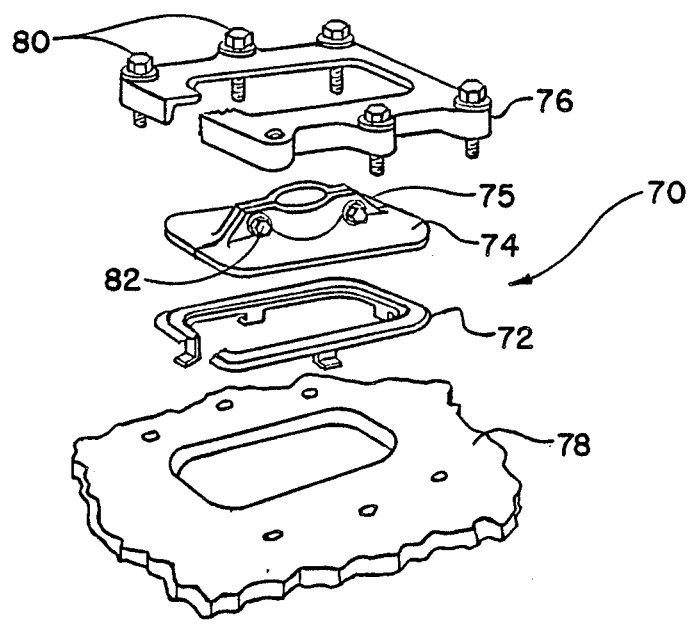
FIG. 7 is an exploded view of a substantially rectangular embodiment of the invention.

The air seal 70 of FIG. 7 comprises a substantially rectangular seal ring 72, a split seal plate 74, 75 and a retainer plate 76. The seal assembly 70 is fastened to a duct wall 78 with bolts 80 that pass through retainer plate 76.

The seal plate is comprised of two sections 74, 75 which are attached to a conduit (not shown) by means of bolts 82. A large number of conduit shapes can be accommodated by split seal plates of this type. The seal plate seals against the conduit and is retained by retainer plate 76.

Seal ring 72 operates in an identical manner to seal ring 44 described above. Air seals are formed by the seal ring legs 86, 88, pressing against the seal plate 74 and the duct wall 78. The seal ring 72 includes retainer clip extensions 84 to aid seal assembly and disassembly by fixing the seal ring to the duct wall.

This seal ring retains the increased pressure, increased sealing feature of seal ring 44. Air pressure increases in the bypass duct increases the spring force on seal ring legs 86, 88 by increasing the air pressure in cavity 90. This feature increases seal effectiveness at high bypass pressures.

These sealing forks and all the other seal members are manufactured from metallic material that are able to successfully withstand the high temperatures generated by supersonic engines. Temperatures of bypass air in these engines can exceed 700° F. and tests have shown this seal effective at those temperatures.

While the invention has been particularly described with reference to the preferred embodiment thereof, it will be understood by those skilled in the art that various changes in substance and form can be made therein without having departed from the principles of the invention as disclosed in the appended claims.

I claim:

1. An air seal for reducing air leakage associated with an accessory conduit penetrating an air duct wall of an aircraft engine, the air seal comprising:
   (a) a sliding seal plate for encircling the accessory conduit;
   (b) a retaining plate connected to the air duct for retaining said seal plate adjacent to the air duct wall; and
   (c) an opposingly sprung seal member for forming an air seal between the air duct wall and said sliding seal plate, wherein said seal member is further characterized by two opposingly sprung seal legs, one of said seal legs being adjacent to said sliding seal plate and the other of said seal legs being adjacent to the air duct wall.

2. The air seal of claim 1 further comprising retaining means for retaining said seal member in a sealing position during assembly and disassembly of said aircraft engine.

3. The air seal of claim 1 further comprising a passage interspaced between said seal legs, said passage exposed to air from said air duct so that increased air duct pressure tends to drive the seal legs apart and increase sealing effectiveness.

* * * * *